United States Patent [19]

Hofverberg

[11] Patent Number: 5,408,696
[45] Date of Patent: Apr. 18, 1995

[54] METHOD AND APPARATUS FOR CORRECTING A RADIO SIGNAL STRENGTH INFORMATION SIGNAL

[75] Inventor: Mikael N. Hofverberg, Kungsängen, Sweden

[73] Assignee: Telefonaktiebolaget L M Ericsson, Stockholm, Sweden

[21] Appl. No.: 989,554

[22] Filed: Dec. 11, 1992

[51] Int. Cl.⁶ .......................................... H04B 17/00
[52] U.S. Cl. ............................. 455/226.2; 455/67.1; 455/186.1
[58] Field of Search ................ 455/53.1, 63, 67.1, 455/67.7, 134, 185.1, 186.1, 226.1, 226.2, 226.4, 349

[56] References Cited

U.S. PATENT DOCUMENTS

| | | |
|---|---|---|
| 4,608,711 | 8/1986 | Goldman . |
| 4,613,990 | 9/1986 | Halpern . |
| 4,696,027 | 9/1987 | Bonta . |
| 4,704,734 | 11/1987 | Menich et al. . |
| 4,718,081 | 1/1988 | Brenig . |
| 4,751,725 | 6/1988 | Bonta et al. . |
| 5,152,009 | 9/1992 | Sato ............................... 455/226.1 X |

FOREIGN PATENT DOCUMENTS 0500362  8/1992  European Pat. Off. ......... 455/226.2
3-49434  3/1991  Japan ............................... 455/226.2

Primary Examiner—Reinhard J. Eisenzopf
Assistant Examiner—Chi H. Pham
Attorney, Agent, or Firm—Burns, Doane, Swecker & Mathis

[57] ABSTRACT

In a radiotelephone base station receiver having components which cause degradation of a received radio signal, an apparatus for producing a correctly compensated radio signal strength information (RSSI) signal from the degraded received radio signal has an analog radio frequency unit and a digital control unit. The analog radio frequency unit receives the degraded received radio signal and generates a degraded RSSI signal, and includes an analog circuit and addressable memory. The addressable memory has compensated RSSI signal values stored at addresses, and the compensated RSSI signal values correspond to possible degraded RSSI signal values. The addresses are generated from the degraded RSSI signal, which may serve directly as the addresses. The digital control unit is coupled to the analog radio frequency unit, and receives the degraded RSSI signal and generates compensated RSSI signal values based on those in the addressable memory.

8 Claims, 3 Drawing Sheets

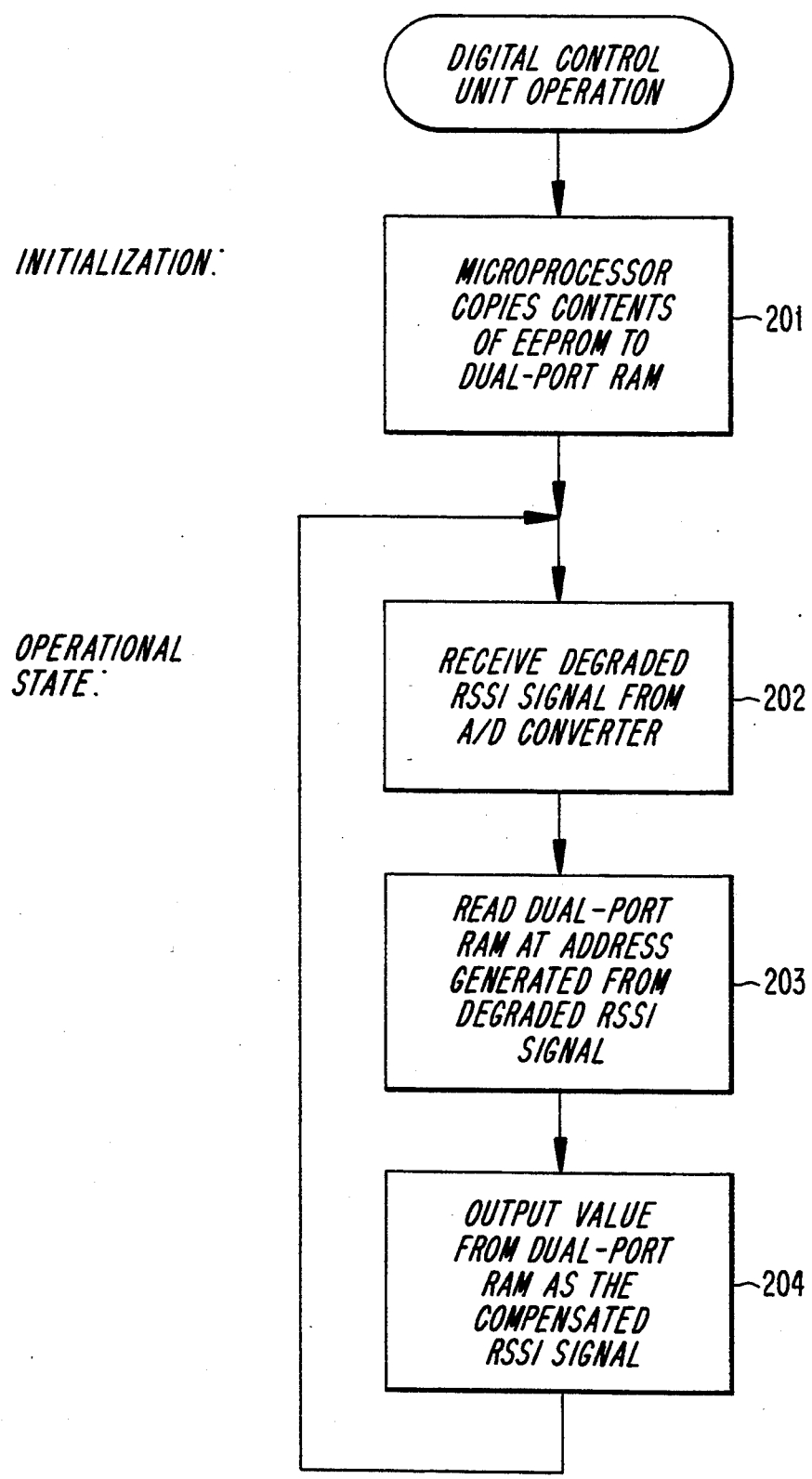

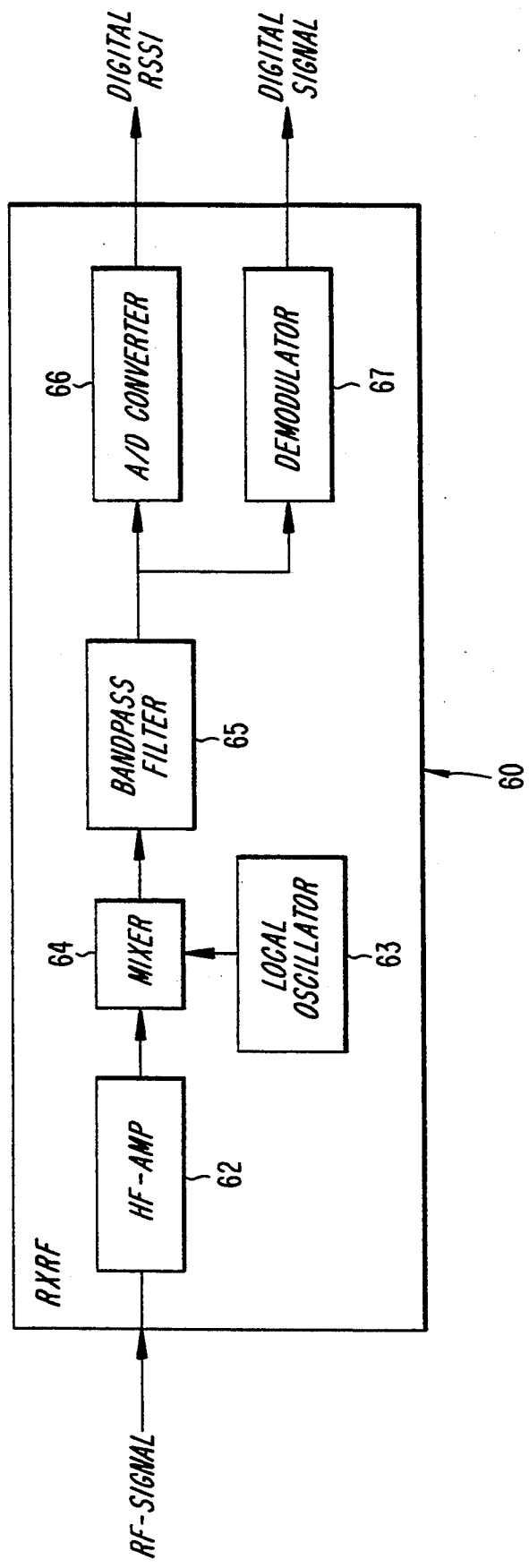

METHOD AND APPARATUS FOR CORRECTING A RADIO SIGNAL STRENGTH INFORMATION SIGNAL

BACKGROUND

The present invention relates to radiotelephone communication systems and more particularly to a method and apparatus for adjusting a measured signal strength value to compensate for receiver-to-receiver variations in signal strength measurement which occur due to differences in system components.

In a cellular telephone communications system operating in accordance with the GSM standard, a base station radio receiver (RRX) measures the strength of a radio signal received from a mobile station to produce a radio signal strength information (RSSI) signal in the form of an eight-bit digital code. The RSSI signal for a given mobile station will vary as that mobile moves within a cell and as it crosses into a new cell. It is known in the art to use RSSI signals to control the handover process, i.e., to determine when a mobile station's established telephone call should be switched from one cell to another.

In accordance with the GSM standard set by ETSI and CEPT, the RSSI signal is allowed to deviate by only ±4 dB from the actual strength of the incoming antenna signal. This tolerance is relatively tight compared with the tolerances of previous standards. As a matter of fact, other standards provide for the RSSI signal to take the form of an analog voltage level without any tolerance limitations.

In a base station site, the radio signal received by the antenna must propagate through a bandpass filter (RXBP), an antenna signal amplifier (RXDA), and a divider (RXD) before entering the radio receiver RRX. As the received radio signal follows its path through the base station site, ripples larger than the standard's RSSI signal tolerance may be generated that cause the RSSI signal to deviate from the above-described standard. To compensate for these overriding ripples and thus to restore the degraded RSSI signal to a level that meets the standard's requirements, analog circuits in the receiver usually have to be adjusted. The amount of RSSI signal adjustment that is required varies from one radio receiver to another, however, because each radio receiver's components affect the incoming signal differently from the components of other radio receivers.

SUMMARY

It is therefore an object of the present invention to provide a radio receiver which is capable of correctly adjusting the RSSI signal to compensate for degradation caused by different system components.

It is a further object of the present invention to provide a radio receiver that correctly adjusts the RSSI signal to compensate for degradation caused by receiver analog circuits even if those analog circuits are replaced by other analog circuits which mandate a different amount of RSSI signal adjustment.

In accordance with one aspect of the present invention, the foregoing and other objects are achieved in a radio receiver having two separable units: an analog radio frequency unit and a digital control unit. The analog radio frequency unit receives a degraded radio signal which is processed by an analog circuit to produce a degraded RSSI signal. The analog radio frequency unit also includes an addressable memory, preferably an electrically erasable programmable read only memory (EEPROM), that is preprogrammed with compensated RSSI signal values that correspond to respective degraded RSSI signal values produced by the analog circuit. Each compensated RSSI signal value is stored in the memory at a respective address that corresponds to the particular degraded RSSI signal value. In a preferred aspect of the invention, the addresses are the degraded RSSI signal values themselves. The analog radio frequency unit may further include an analog-to-digital (A/D) converter for converting the degraded RSSI signal to a digital degraded RSSI signal.

The digital control unit is coupled to the analog radio frequency unit, receives the degraded RSSI signal, and produces compensated RSSI signal values based on the values stored in the analog radio frequency unit's memory. In one aspect of the invention, it does this by generating an address from the degraded RSSI signal and using this generated address to access an addressable memory that contains the compensated RSSI signal values. The digital control unit can include its own addressable memory, which may be a dual-port random access memory (DP-RAM). Dedicated logic on the digital control unit, such as a programmed microprocessor, initializes the DP-RAM by copying compensated RSSI signal values from the analog unit's EEPROM into the digital unit's DP-RAM. In this way, the degraded RSSI signal can be used to generate appropriate DP-RAM addresses for reading corresponding compensated RSSI signal values.

BRIEF DESCRIPTION OF THE DRAWINGS

The objects and advantages of the invention will be understood by reading the following detailed description in conjunction with the drawings in which:

FIG. 2 is a flow chart showing the operation of a digital control unit in accordance with the present invention; and FIG. 3 is a simplified block diagram of an analog radio frequency unit and analog circuit in accordance with the present invention.

DETAILED DESCRIPTION

Figure 1:
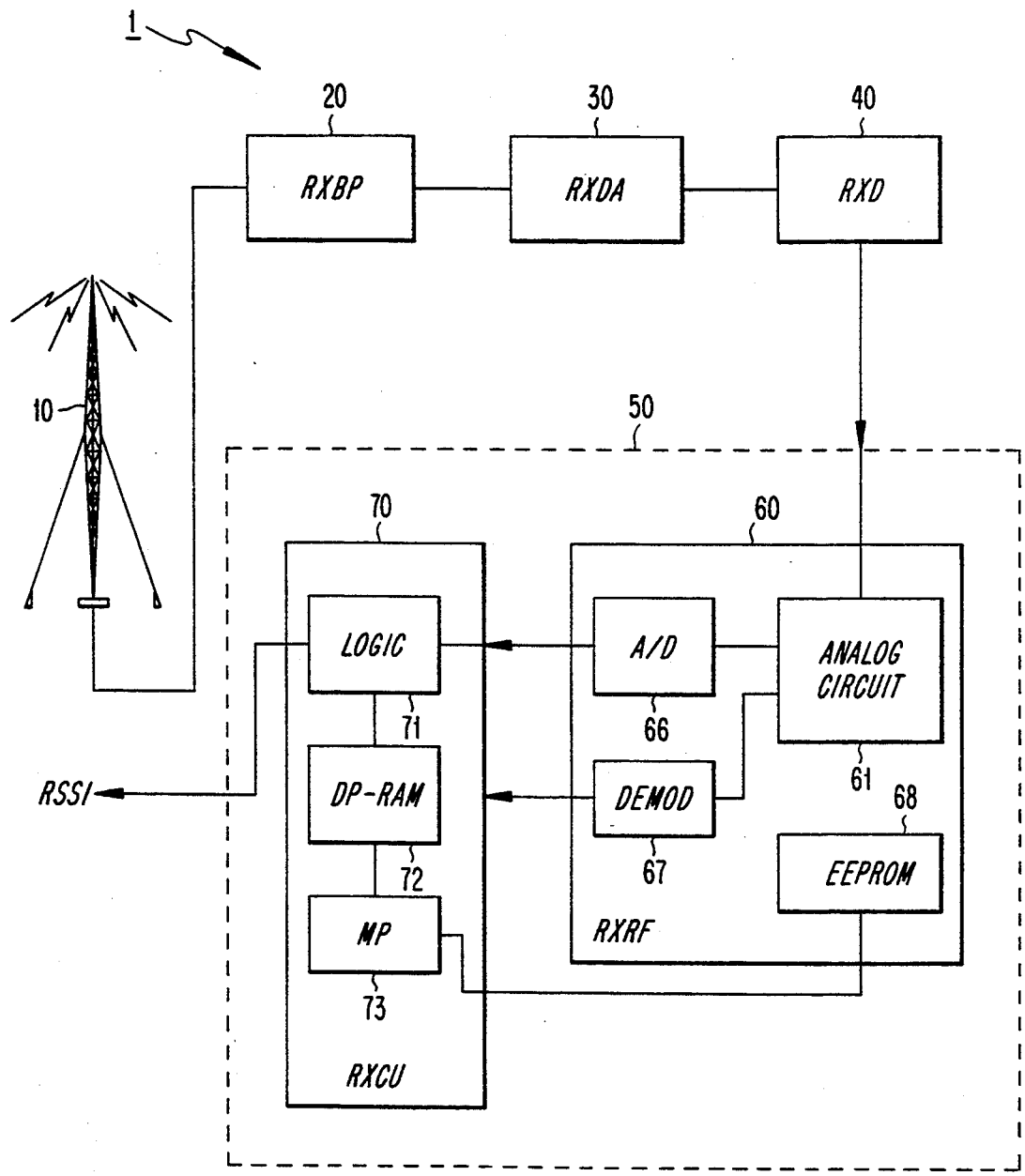
FIG. 1 is a block diagram of a base station site including a radio receiver in accordance with the present invention.

Referring to FIG. 1, a block diagram of a GSM base station 1 is shown. The base station 1 comprises an antenna 10 which is coupled to the input of a bandpass filter (RXBP) 20. The output of the bandpass filter 20 is coupled to the input of an antenna signal amplifier (RXDA) 30. The output of the antenna signal amplifier 30 is coupled to the input of a divider (RXD) 40, whose output is, in turn, coupled to the input of a radio receiver (RRX) 50. The antenna 10, bandpass filter 20, antenna signal amplifier 30, and divider 40 are components that are well known to those of ordinary skill in the art of radiotelephone communication systems, and need not be described here in further detail.

As a received signal propagates from the antenna 10 to the radio receiver 50, its signal strength may be degraded as described above. In accordance with one aspect of the present invention, the radio receiver 50 advantageously comprises an analog radio frequency unit (RXRF) 60 and a digital control unit (RXCU) 70. Each of the units 60, 70 is preferably built on a separate card module which can be easily replaced in case of failure or for servicing.

In the preferred embodiment, the radio frequency unit 60 receives the degraded received radio signal and generates a degraded RSSI signal. Among other appropriate components, the analog radio frequency unit 60 includes an analog circuit 61, which receives the signal that is input to the radio frequency unit 60 from the divider 40.

A simplified block diagram of the analog radio frequency unit 60 and analog circuit 61 is shown in FIG. 3. It will be appreciated that other components and functions may be included in the RXRF 60, but FIG. 3 shows only those that are most relevant to generation of the RSSI signal. The RF signal from the divider 40 is first amplified by a suitable high-frequency (HF) amplifier 62. The output of HF-amp 62 is then mixed with the output of a local oscillator 63 by an appropriate mixer 64, the output of which is passed to a suitable bandpass filter 65.

The output of the bandpass filter 65 is provided to an analog-to-digital converter 66, which measures the signal's amplitude and converts it into a digital representation. The output of the A/D converter 66 is thus a digital signal that represents the signal strength of the received signal (RSSI), which is sent to the digital control unit 70. In the preferred embodiment, the digital RSSI signal is an eight-bit number, but it will be appreciated that other formats could be used. The output of the bandpass filter 65 is also provided to a suitable demodulator 67 for restoring the information, which is usually in digital format, originally transmitted.

Because of degradation that can occur as the received radio signal passes through the system components, the digital RSSI signal output from the A/D converter 66 may deviate by more than the tolerance allowed by the applicable standard (e.g., by more than ±4 dB in the case of the GSM standard set by ETSI and CEPT). Therefore, this signal must be adjusted to make it comply with the applicable standard. As mentioned above, however, the analog radio frequency unit 60 is preferably constructed on a modular card which may easily be replaced by another similar unit. Because analog components may vary from card to card, the amount of adjustment necessary to compensate for signal strength degradation is not constant, but is, instead, a function of the particular analog unit 60 that is plugged into the radio receiver 50.

To solve the problem of correctly compensating for signal strength degradation regardless of which particular system components are used, an analog radio frequency unit 60 in accordance with the present invention also contains an addressable memory. In the preferred embodiment, an electrically erasable programmable read only memory (EEPROM) 68 is used. The advantage of an EEPROM, rather than a ROM or EPROM, is the ease with which the RXRF unit 60 can be recompensated after service.

In accordance with the present invention, the EEPROM 68 is programmed to store a table of compensated RSSI signal values that corresponds to a set of possible degraded RSSI signal values. Further in accordance with the present invention, in order to quickly and easily retrieve an appropriate compensated RSSI signal value for a given degraded RSSI signal value, the compensated RSSI signal value is stored at an EEPROM address that is generated from the given degraded RSSI signal value. In the preferred embodiment, address generation is simplified by using the given degraded RSSI signal value itself as the address.

For example, if a particular analog radio frequency unit produces a degraded RSSI signal value of 43, and it is known that proper compensation for this particular analog radio frequency unit requires that the degraded RSSI signal be adjusted to a value of 58, then the value 58 would be stored at address 43 in the EEPROM. It can be seen that by arranging the table of compensated RSSI values within the EEPROM 68 in this fashion, correct values for particular degraded values may be quickly retrieved. Moreover, the inclusion of an EEPROM 68 on each analog radio frequency unit 60 provides the additional benefit of allowing each analog radio frequency unit to store a set of compensated RSSI values that particularly compensate for the analog components found on that particular unit. Thus, the replacement of one analog radio frequency unit 60 with another automatically regulates the way RSSI values will be adjusted to compensate for degradation.

The digital control unit 70 is coupled to the output of the A/D converter 66 to receive the degraded digital RSSI signal, and also is coupled to the EEPROM 68 to receive compensated RSSI signal values. The digital control unit 70 produces a compensated RSSI signal at its output by, for example, receiving the degraded RSSI signal from the A/D converter 66 and using the EEPROM 68 to produce the compensated RSSI signal.

In the preferred embodiment, the digital control unit 70 includes digital logic 71 which is coupled to the output of the A/D converter 66 and to one port of a dual-port random access memory (DP-RAM) 72. The other port of the DP-RAM 72 is coupled to a microprocessor (MP) 73 that is suitably programmed to carry out the operations herein described. The MP 73 is also coupled to the EEPROM 68 located on the analog radio frequency unit 60.

The operation of the digital control unit 70 is shown in FIG. 2, and is described below. During an initialization state shown in FIG. 2 as block 201, the MP 73 retrieves information from the EEPROM 68 and stores it in the DP-RAM 72. In accordance with one aspect of the invention, the information copied comprises at least one of the compensated RSSI signal values stored in the EEPROM 68, and that value is copied into a corresponding address in the DP-RAM 72. In this way, degraded RSSI signal values may be used to generate the DP-RAM memory addresses which point to corresponding compensated RSSI signal values. In the preferred embodiment, all of the compensated RSSI signal values in the EEPROM 68 are retrieved and stored in the DP-RAM 72 at addresses that are equal to the respective degraded RSSI signal values. Thus, for example, if the EEPROM contains the value 58 at memory address 43, then the DP-RAM will also contain the value 58 stored at memory address 43.

After the initialization period has been completed, the digital control unit 70 enters an operational state, which is represented in FIG. 2 as blocks 202, 203, and 204. During the operational state, the digital logic 71 receives a degraded RSSI signal from the A/D converter 66 and then generates a DP-RAM address from the degraded RSSI signal. As described above, the logic 71 preferably supplies the degraded RSSI signal to the DP-RAM 72 as an address, and then initiates a read of the DP-RAM 72. The digital logic 71 provides the data retrieved from the DP-RAM 72 as the compensated RSSI signal at one of the outputs of the digital control unit 70.

The functions associated with the operational state are then repeated for the next degraded RSSI signal measurement. These functions are, of course, preferably carried out in real time by suitable components. The memories should be able to store all values that can be supplied by the A/D converter 66. For example, for an eight-bit A/D converter, the memories' sizes should be at least 8×256 bits, while for a nine-bit A/D, the memories' sizes should be at least 9×512 bits. Memory sizes for other A/D converters would scale accordingly. As for minimum clock speeds and the like, they depend of course on the rate at which the RSSI values are produced or sampled.

It should be readily apparent to those having ordinary skill in the art that the invention is not limited to the particular embodiment described herein but by the scope of the attached claims. For example, it is not necessary that the addressable memory on the analog radio frequency unit 60 be an EEPROM, nor is it necessary that a dual-port RAM be utilized on the digital control unit 70; equivalent storage would also work. Also, the programmed microprocessor 73 could be replaced by another digital logic unit, such as a gate array, that is suitably configured to perform the same function as the programmed microprocessor. Moreover, RSSI signal degradations due to the other components of the base station, e.g. the filter 20, amplifier 30, and divider 40, or to other factors can also be compensated. Furthermore, although the preferred embodiment has made reference to the GSM standard set by ETSI and CEPT, the invention is equally applicable to systems conforming to all standards where the RSSI signal is restricted or could be restricted, such as in the American Digital Cellular (ADC, also referred to as D-AMPS) and Japanese Digital Cellular (JDC) standards.

What is claimed is:

1. In a radio receiving system having components that cause degradation of a received radio signal, an apparatus in a radio receiver for producing a compensated radio signal strength information (RSSI) signal from a degraded received radio signal, comprising:
   replaceable means for receiving the degraded received radio signal and generating a degraded RSSI signal therefrom, comprising
      analog means for generating the degraded RSSI signal from the degraded received radio signal, and
      first means for storing a plurality of RSSI signal values at respective addresses, wherein each of the plurality of RSSI signal values corresponds to a respective value of the degraded RSSI signal generated by the analog means, each of the plurality of RSSI signal values is compensated for the respective degradation of the received radio signal, and each of the plurality of RSSI signal values is stored at an address corresponding to the respective value of the degraded RSSI signal; and
   digital means, coupled to the replaceable receiving and generating means, for producing, from the degraded RSSI signal and from at least one of the plurality of RSSI signal values, a compensated RSSI signal value,
   wherein the replaceable receiving and generating means further comprises an analog-to-digital converter for converting the degraded RSSI signal generated by the analog means to a digital degraded RSSI signal that is coupled to the digital means,
   and wherein the digital means comprises:
      second means for storing RSSI signal values at respective addresses;
      first digital logic means, coupled to the analog-to-digital converter and to the second storing means, for generating an address from the digital degraded RSSI signal and for retrieving from the second storing means an RSSI signal value stored at the generated address, wherein the first digital logic means provides at an output the retrieved RSSI signal value as the compensated RSSI signal value; and
      second digital logic means, coupled to the first and second storing means, for retrieving from the first storing means the RSSI signal value stored at an address corresponding to the degraded digital RSSI signal and for causing the second storing means to store at the generated address the RSSI signal value retrieved from the first storing means.

2. The apparatus of claim 1, wherein the second digital logic means is a programmed microprocessor.

3. The apparatus of claim 2, wherein the second storing means is a dual-port random access memory.

4. In a radio receiving system having components that cause degradation of a received radio signal, an apparatus in a radio receiver for producing compensated radio signal strength information (RSSI) signal from a degraded received radio signal, comprising:
   replaceable means for receiving the degraded received radio signal and generating a degraded RSSI signal therefrom, comprising
      analog means for generating the degraded RSSI signal from the degraded received radio signal, and
      first means for storing a plurality of RSSI signal values at respective addresses, wherein each of the plurality of RSSI signal values corresponds to a respective value of the degraded RSSI signal generated by the analog means, each of the plurality of RSSI signal values is compensated for the respective degradation of the received radio signal, and each of the plurality of RSSI signal values is stored at an address corresponding to the respective value of the degraded RSSI signal; and
   digital means, coupled to the replaceable receiving and generating means, for producing, from the degraded RSSI signal and from at least one of the plurality of RSSI signal values, a compensated RSSI signal value,
   wherein the digital means comprises:
      second means for storing RSSI signal values at respective addresses;
      first digital logic means, coupled to the analog means and to the second storing means, for generating an address from the degraded RSSI signal and for retrieving from the second storing means an RSSI signal value stored at the generated address, wherein the first digital logic means provides at an output the RSSI signal value stored at the generated address as the compensated RSSI signal value; and
      second digital logic means, coupled to the first and second storing means, for retrieving from the first storing means the plurality of RSSI signal values, for causing the second storing means to store the plurality of RSSI signal values at addresses corresponding to the respective values of the degraded RSSI signal.

5. The apparatus of claim 4, wherein the second digital logic means is a programmed microprocessor.

6. The apparatus of claim 5, wherein the second storing means is a dual-port random access memory.

7. For a radio receiving system having components that cause degradation of a received radio signal, a method for producing a compensated radio signal strength information (RSSI) signal from a degraded received radio signal, comprising the steps of:

produced, from first analog means, a degraded RSSI signal value from the degraded received radio signal;

storing a plurality of RSSI signal values in a first memory at respective addresses, wherein each of the plurality of RSSI signal values corresponds to a respective value of the degraded RSSI signal, each of the plurality of RSSI signal values is compensated for the respective degradation of the received radio signal, and each of the plurality of RSSI signal values is stored at an address corresponding to the respective value of the degraded RSSI signal;

using an analog-to-digital converter to convert the degraded RSSI signal to a digital degraded RSSI signal;

retrieving from the first memory a stored RSSI signal value from an address location corresponding to the digital degraded RSSI signal, and storing the retrieved RSSI signal value into a corresponding address location of a second memory;

generating an address from the digital degraded RSSI signal value;

retrieving from the second memory the RSSI signal value stored at the generated address; and providing the RSSI signal value that was retrieved from the second memory as the compensated RSSI signal.

8. The method of claim 7, wherein the first memory is a non-volatile memory and the second memory is a volatile memory.

* * * * *